May 20, 1969    H. E. SHOBE    3,445,094
DYNAMICALLY BALANCED MULTI-PATH LIQUID-GAS CONTACTING
Filed June 8, 1964    Sheet 1 of 2
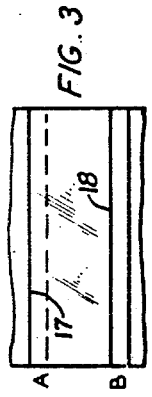
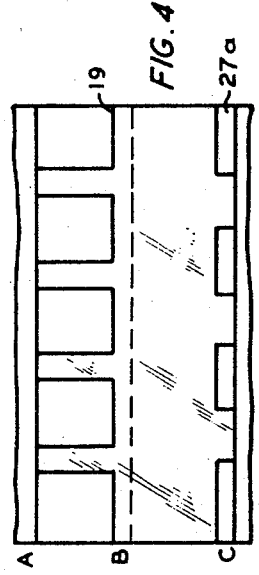
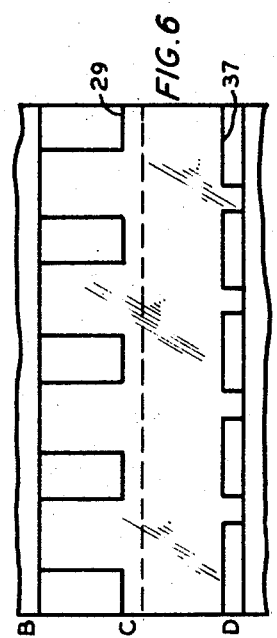
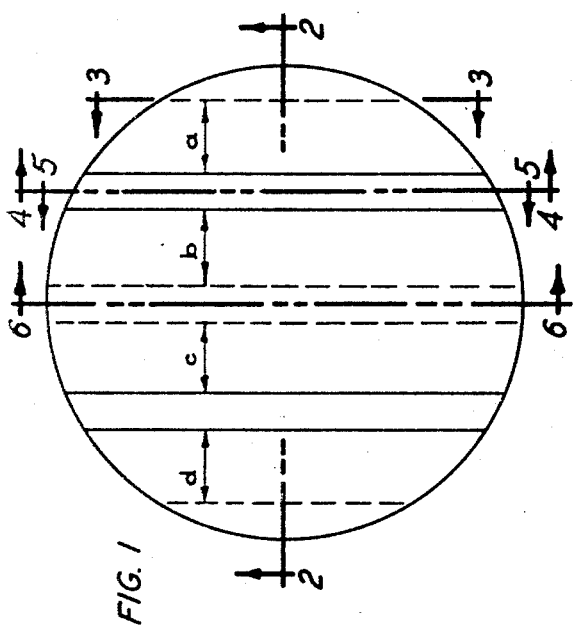
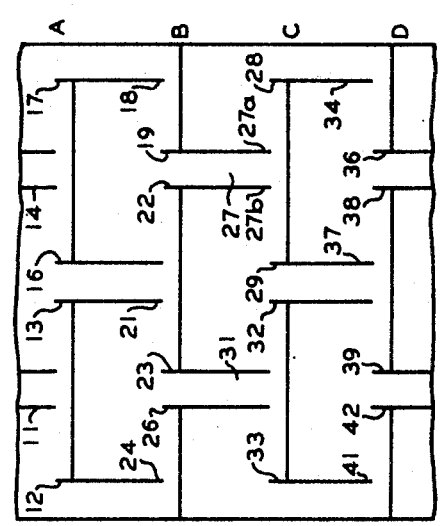
INVENTOR.
H.E. SHOBE
BY
Young + Jugg
ATTORNEYS

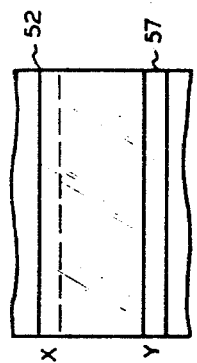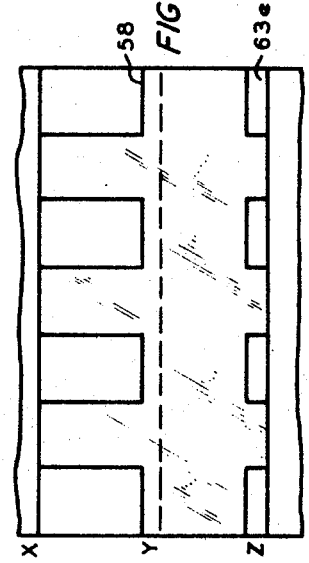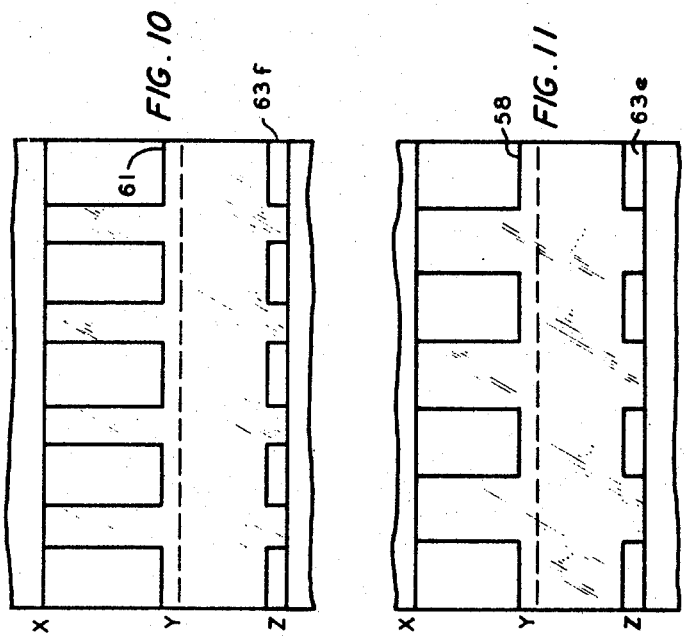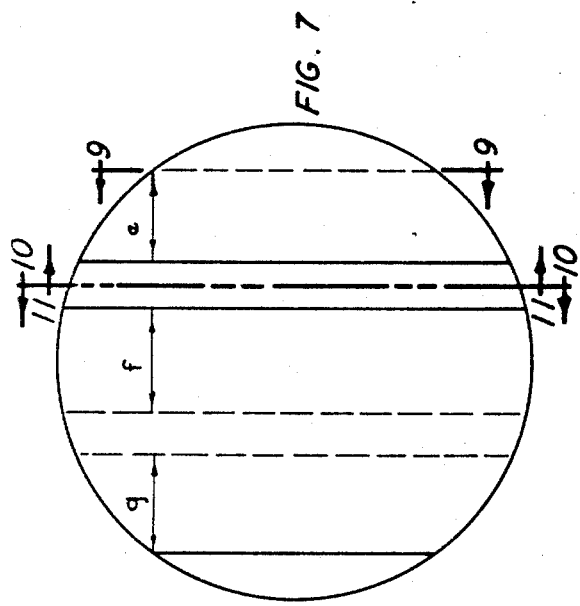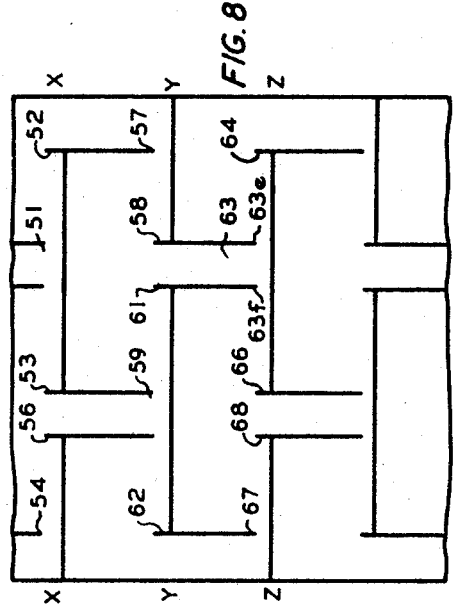

United States Patent Office 3,445,094
Patented May 20, 1969

3,445,094
DYNAMICALLY BALANCED MULTI-PATH
LIQUID-GAS CONTACTING
Henry E. Shobe, Bartlesville, Okla., assignor to Phillips
Petroleum Company, a corporation of Delaware
Filed June 8, 1964, Ser. No. 373,363
Int. Cl. B01d 3/22
U.S. Cl. 261—114    3 Claims

ABSTRACT OF THE DISCLOSURE

A gas and liquid contact column having a multiplicity of multi-path contacting trays with two zones of unequal areas. The trays have a plurality of downcomers dividing said trays into equal flow paths. Baffle means are provided with a plurality of separate flow openings spaced along the baffle means and proportional to the zones of unequal areas being fed by the respective downcomer.

This invention relates to liquid-gas contacting. In one aspect, it relates to liquid-gas contacting apparatus comprising multi-path contacting trays. In another aspect it relates to fractional distillation.

Liquid-gas contacting is involved in such liquid-gas transfer systems as, for example, distillation, rectification, absorption, stripping, humidification, dehumidification, dephlegmation, etc. For large capacity liquid-gas contacting installations, there are economic advantages in using large capacity contact vessels.

For example, for large capacity fractional distillation installations there are economic advantages in using one or more large diameter columns rather than a larger number of parallel smaller diameter columns. However, for simple two-path trays, as the column diameter is increased, a point is reached at which the horizontal liquid cross-flow paths become too long for stable operation. This occurs due to the sloping liquid surface which exists in order to supply the energy necessary to drive the liquid across the flow path. When the length of the flow path is excessive, a sufficient variation in head of liquid exists across the tray that upflowing vapor flows in greater quantity near the liquid discharge side of the flow path where the head of liquid is smallest. The excessive vapor flow in this area entrains liquid and, as the vapor redistributes itself across the column, tends to move the liquid toward a point of higher head, thus aggravating the imbalance. Unstable tray operation and column flooding result. The exact diameter of column for which length of flow path becomes a serious problem varies with the density of the liquid and other parameters, but, for many of the common lighter hydrocarbon separations, the longest flow path which can be used efficiently often is of the order of four feet in length.

Multi-path trays can avoid the problems occasioned by long flow paths. By multi-path tray as used herein is meant one which has three or more separate liquid flow paths between tray inlets and tray outlets. This concept is distinguished from dividing liquid flow into several portions across a single tray path. As used herein, therefore, a "path" is a portion of a tray over which liquid flows substantially in a single direction from a tray inlet to a tray outlet. On adjacent paths the flow is substantially in opposite directions, either from separate spaced inlets to a common outlet, or from a common inlet to separate outlets. The desired result is to attain shorter flow path lengths. However, with multi-path trays I have found that the column operation is difficult to balance, that is, to properly apportion liquid flows in particular, and that imbalance can be as detrimental to stable operation as long flow paths.

An objection of this invention is to contact fluids efficiently.

Another object of this invention is to provide balanced operation of a liquid-gas contacting column having multi-path trays.

Another object of this invention is to determine the physical proportions of the various internal components of a liquid-gas contacting column for dynamically balanced operation.

Another object of this invention is to provide efficient liquid-gas contacting apparatus.

Another object of this invention is to separate fluids efficiently by fractional distillation.

Other aspects, objects and the advantages of my invention are apparent in the written description, the drawing and the claims.

I have found that for balanced operation and highest contacting efficiency of a liquid-gas contacting column having multi-path trays, the following factors should be equal on the several sections of a given tray:

(1) Gas-liquid ratio
(2) Gas-liquid contact time
(3) Gas-liquid disengaging time
(4) Gas velocities
(5) Liquid velocities
(6) Gas rate per unit of active area.

The word "gas" is used herein, where appropriate, to include both normally gaseous and vaporous normally liquid materials.

According to my invention, dynamic balance of the above conditions within a liquid-gas contacting column having multi-path trays is achieved by a tray structure in which:

(1) The corresponding vertical dimensions of the tray sections are made equal.
(2) The tray section flow paths are equal in length.
(3) The horizontal dimensions of weir and downcomer lengths of the tray sections are proportioned to effect equal flow per unit of tray section area and equal liquid height on tray sections and in downcomers.
(4) Flow paths are equal by positioning downcomers to drain equal horizontal lengths of the tray.

Although the total horizontal length of each weir and corresponding downcomer is fixed by the length of tray across which each extends, according to my invention the effective length can be shortened by using vertical baffles along a part of the length. By unequal baffling of downcomers which distribute liquid in two directions to unequal areas, the flow can be proportioned to the areas. The height of liquid on a tray is controlled by baffling the weirs. Since the flow over a weir is proportional to the effective length and height of liquid, when the effective length is shortened the height is increased. This effect is utilized according to my invention to make the height of liquid on various portions of a tray equal.

As noted above, the distribution of liquid among the several tray sections is controlled by unequal downcomer baffling. The liquid holdup in the downcomers is determined by the total baffling on the downcomers. In this way the heights of liquid on the trays in the several downcomers and in the disengaging spaces above the liquid levels are controlled.

In all instances, adjacent baffles preferably are alternated, that is, the baffle area on one side is opposite an open area on the other side, to give maximum improvement in preventing undesired splash and blow effects.

My invention is applicable to all multi-path trays using any of the known types of contacting means.

In the drawing:

FIGURE 1 is a schematic horizontal cross section of a four-path liquid-gas contacting column according to my invention.

FIGURES 2, 3, 4, 5 and 6 are schematic partial vertical cross sections of the column of FIGURE 1.

FIGURE 7 is a schematic horizontal cross section of a three-path liquid-gas contacting column according to my invention.

FIGURES 8, 9, 10 and 11 are schematic partial vertical cross sections of the column of FIGURE 7.

In the apparatus of FIGURE 1, there are four flow paths, $a$, $b$, $c$, $d$, making this a four-path design. Referring to FIGURE 1 and FIGURE 2, on tray A, path $d$ is from downcomer 11 over weir 12, path $c$ is from downcomer 11 to weir 13, path $b$ is from downcomer 14 to weir 16 and path $a$ is from downcomer 14 to weir 17.

On tray B, path $a$ is from downcomer 18 to weir 19, path $b$ is from downcomer 21 to weir 22, path $c$ is from downcomer 21 to weir 23 and path $d$ is from downcomer 24 to weir 26. Similarly, on tray C, path $a$ is from downcomer 27 to weir 28, path $b$ from downcomer 27 to weir 29, path $c$ from downcomer 31 to weir 32, and path $d$ from downcomer 31 to weir 33. On tray D, path $a$ is from downcomer 34 to weir 36, path $b$ from downcomer 37 to weir 38, path $c$ from downcomer 37 to weir 39, and path $d$ from downcomer 41 to weir 42. Each of trays A, B, C and D are spaced from adjacent trays by the same distance. Paths $a$, $b$, $c$ and $d$ are equal in length. Referring to tray C, it is seen that the area over which flow path $a$ extends is smaller than the area over which flow path $b$ extends. Although the edge 27$a$ of downcomer 27 is shorter than the edge 27$b$ the lengths of these edges still are not in proportion with the areas fed by each. Therefore, edge 27$a$ is partially baffled, as illustrated in FIGURE 4, while the edge 27$b$ is unbaffled, as illustrated in FIGURE 5, so that the flow of liquid to the areas is in proportion to the areas themselves. That is, the unbaffled portion at edge 27$a$ is in the same proportion to the area within flow path $a$ as the length under edge 27$b$ is to the area within flow path $b$. The two sides of downcomer 31 are similarly baffled to feed areas $c$ and $d$.

Although the flow is thus proportioned to the areas, the depth of liquid on the tray C, over the paths $a$ and $b$, is determined by the height of liquid flowing over the weirs 28 and 29. Since weir 29 is longer than the unbaffled area under edge 27$b$, while weir 28 is shorter than the unbaffled area under edge 27$a$, it is necessary to supply baffling for weir 29 to equalize the spread of fluid over the tray A. This is illustrated in FIGURE 6.

Although the areas under flow paths $b$ and $c$ are equal and, therefore, the two sides or edges of downcomer 37 are equal, this downcomer is baffled, as illustrated in FIGURE 6, to control the flow to tray D so that the head of liquid held within downcomer 37 is equal to the head of liquid held within downcomers 34 and 41, which are unbaffled. Weir 36 and corresponding weir 42 are baffled in the same manner as weir 19 shown in FIGURE 4 so that the height of liquid on tray D over the areas for flow paths $b$ and $c$ is equal to the height over the areas for flow paths $a$ and $b$. Similar baffling is provided for subsequent and preceding trays within the column.

In FIGURE 7, illustrating a three path column, flow paths $e$, $f$ and $g$ are equal in length. Flow path $e$ on tray X is from downcomer 51 to weir 52, flow path $f$ from downcomer 51 to weir 53 and flow path $g$ from downcomer 54 to weir 56. Similarly on tray Y flow path $e$ is from downcomer 57 to weir 58, flow path $f$ from downcomer 59 to weir 61 and flow path $g$ from downcomer 59 to weir 62. On tray Z flow path $e$ is from downcomer 63 to weir 64, flow path $f$ from downcomer 63 to weir 66 and flow path $g$ from downcomer 67 to weir 68.

For the flow on tray Z, the downcomer 63 is baffled as illustrated in FIGURES 10 and 11. Weirs 58 and 61 are baffled, also as shown in FIGURES 10 and 11. Downcomer 57 and weir 52 are unbaffled as shown in FIGURE 9. Similarly, downcomers 54 and 67 and weirs 62 and 64 are unbaffled while downcomers 51 and 59 are baffled in the same manner as downcomer 63, weirs 56 and 68 are baffled in the same manner as weir 58 and weirs 53 and 66 are baffled in the same manner as weir 61.

The following examples relate to the operation of a reboiled absorber of the type illustrated in FIGURE 3 of U.S. 2,984,988, Berger et al. (1961).

Example I

In an example of a four-path column having valve trays without balancing, the dimensions are as shown in Table I. With conditions and feed as shown in Table II, the results shown in Table III are obtained.

Example II

In an example of a four-path column having valve trays with balancing, the dimensions are as shown in Table IV. With feed and conditions as shown in Table V, the results shown in Table VI are obtained.

A comparison of Examples I and II reveals the advantages obtained by balancing a four-path column in obtaining balance conditions on each tray, thus reducing the tendency for column upset.

Example III

In an example of a three-path column having sieve trays without balancing, the dimensions are as shown in Table VII. With conditions and feed as shown in Table VIII, the results shown in Table IX are obtained.

Example IV

In an example of a three-path column having sieve trays with balancing, the dimensions are as shown in Table X. With conditions and feed as shown in Table XI, the results shown in Table XII are obtained.

A comparison of Examples III and IV reveals advantages obtained by balancing a three-path column in obtaining balance conditions on each tray, thus reducing the tendency for column upset.

In Example I and Example III, it is assumed that balanced flow of fluid is attained across the various paths, and calculations demonstrate that such balanced conditions are not attained. This is illustrated by the fact that calculated values of pressure drop across different paths between the same location differ, when actually, of course, the drops must be equal. Similarly, calculated values of downcommer backup are different in the same downcomer are obvious inequity. Therefore, it is clear that balanced flow conditions are not achieved. In actual operation, a redistributing of flow occurs to reach equilibrium resulting in poor liquid vapor contact. In extreme cases, one path can have substantially all liquid while another path has substantially all vapor.

TABLE I

|  | Tray A and C | | Tray B and D | |
| --- | --- | --- | --- | --- |
|  | Path b | Path a | Path b | Path a |
| Tray Spacing, in | 24 | 24 | 24 | 24 |
| Tower Diameter, ft | 12.50 | 12.50 | 12.50 | 12.50 |
| Tower Area, sq. ft | 122.72 | 122.72 | 122.72 | 122.72 |
| The following dimensions are for one-half Tray: | | | | |
| Downcomer area, sq. ft | 8.08 | 6.01 | 8.08 | 6.01 |
| Downcomer seal area, sq. ft | 8.08 | 6.01 | 8.08 | 6.01 |
| Bubbling area, sq. ft | 19.04 | 14.16 | 19.04 | 14.16 |
| Free area, sq. ft | 27.12 | 20.17 | 27.12 | 20.17 |
| Min. area under Downcomer, sq. ft | 2.43 | 2.16 | 2.60 | 1.53 |
| Waste area, sq. ft | 0 | 0 | 0 | 0 |
| Overflow Weir length, in | 149.19 | 88.34 | 140.25 | 124.56 |
| Length of overflow Blanked Area, in | 0 | 0 | 0 | 0 |
| Inlet Weir length, in | 140.25 | 124.51 | 149.19 | 88.34 |
| Length of Inlet Blanked area, in | 0 | 0 | 0 | 0 |
| Length of Flow Path, in | 18.83 | 18.83 | 18.83 | 18.83 |
| Width of Flow path, in | 129.51 | 96.32 | 129.51 | 96.32 |
| Overflow Weir Height, in | 3.00 | 3.00 | 3.00 | 3.00 |
| Downcomer Clearance, in | 2.50 | 2.50 | 2.50 | 2.50 |
| Inlet Weir Height, in | 0 | 0 | 0 | 0 |
| Valve Pitch | 12.00 | 12.00 | 12.00 | 12.00 |
| Number of Valves/Tray | 228 | 170 | 228 | 170 |

TABLE II

[Temperature 174° F., Pressure 300 p.s.i.a.]

|  | Vapor | Liquid |
| --- | --- | --- |
| Component: | | |
| Nitrogen | 0. | 0. |
| Carbon Dioxide | 0.0008 | 0.0004 |
| Methane | 0.0141 | 0.0077 |
| Ethane | 0.3079 | 0.1681 |
| Propane | 0.6197 | 0.4346 |
| Isobutane | 0.0258 | 0.0319 |
| n-Butane | 0.0266 | 0.0420 |
| Isopentane | 0.0019 | 0.0058 |
| n-Pentane | 0.0012 | 0.0042 |
| Heptane | 0.0003 | 0.0028 |
| MSO | 0.0015 | 0.3026 |
| Total | 0.9998 | 1.0001 |
| Mols | 233,274 | 430,701 |
| LR | 0.400 |  |
| Rates Per Tray: | | |
| Density, lbs./cu. ft | 2.168 | 33.584 |
| Viscosity, Centipoise | 0.010 | 0.143 |
| Rate, c.f.s | 50.281 | 11.320 |
| Rate, V Load | 13.209 |  |
| Rate, Std. g.p.d./sq. ft. of c.s.a | 19,513 |  |
| Rate, Std. g.p.d | 2,394,607 |  |
| Rate, g.p.d |  | 7,315,665 |
| Rate, g.p.m |  | 5,080 |

|  | Paths b and c Trays A, B, C, D | | Paths a and d Trays A, B, C, D | |
| --- | --- | --- | --- | --- |
|  | Vapor | Liquid | Vapor | Liquid |
| Rate, c.f.s | 14.418 | 3,246 | 10.723 | 2.414 |
| Rate, V Load | 3.788 |  | 2.817 |  |
| Rate, Std. g.p.d | 686,646 |  | 510,657 |  |
| Rate, g.p.d |  | 2,097,745 |  | 1,560,088 |
| Rate, g.p.m |  | 1,457 |  | 1,083 |

TABLE III

|  | Trays A and C | | Trays B and D | |
| --- | --- | --- | --- | --- |
|  | Paths b and c | Paths a and d | Paths b and c | Paths a and d |
| Flooding check: Fraction flood at design V/L Ratio | 0.801 | 0.914 | 0.829 | 0.753 |
| Hydraulics: | | | | |
| Downcomer Back-Up | 9.980 | 9.898 | 9.848 | 10.627 |
| Dry Tray Pressure Drop | 1.951 | 1.951 | 1.951 | 1.951 |
| Total Tray Pressure Drop | 5.360 | 6.031 | 5.523 | 5.084 |
| Pressure Drop through Min. Area Under Downcomer | 1.048 | 0.734 | 0.915 | 1.462 |
| Height of Liquid on Tray | 3.409 | 4.081 | 3.573 | 3.133 |
| Downcomer Residence Time, seconds | 4.979 | 4.979 | 4.979 | 4.979 |
| Vapor Velocities, ft./sec. Bubbling Area | 0.757 | 0.757 | 0.757 | 0.757 |
| Tray Efficiency for the Key Components | 0.556 | 0.615 | 0.571 | 0.528 |
| Liquid Rates: | | | | |
| G.p.m./inch of Overflow Weir Length | 9.765 | 12.264 | 10.387 | 8.698 |
| G.p.m./inch of Average Flow Path Width | 11.248 | 11.248 | 11.248 | 11.248 |

TABLE IV

|  | Trays A and C | | Trays B and D | |
| --- | --- | --- | --- | --- |
|  | Paths b and c | Paths a and d | Paths b and c | Paths a and d |
| Tray Spacing, in | 24 | 24 | 24 | 24 |
| Tower Diameter, ft | 12.50 | 12.50 | 12.50 | 12.50 |
| Tower area, sq. ft | 122.72 | 122.72 | 122.72 | 122.72 |
| The following dimensions are for one-half tray: | | | | |
| Downcomer area, sq. ft | 8.32 | 6.19 | 8.32 | 6.19 |
| Downcomer seal area, sq. ft | 8.32 | 6.19 | 8.32 | 6.19 |
| Bubbling area, sq. ft | 18.53 | 13.80 | 18.53 | 13.80 |
| Free area, sq. ft | 22.36 | 24.49 | 22.36 | 24.49 |
| Min. area under Downcomer, sq. ft | 2.44 | 1.82 | 2.08 | 1.55 |
| Waste area, sq. ft | 0 | 0 | 0 | 0 |
| Overflow Weir length, in | 119.78 | 89.17 | 140.45 | 104.56 |
| Length of Overflow Blanked Area, in | 29.36 | 0 | 0 | 19.74 |
| Inlet Weir length, in | 140.45 | 104.56 | 119.78 | 89.17 |
| Length of Inlet Blanked Area, in | 0 | 19.67 | 29.36 | 0 |
| Length of Flow Path, in | 18.33 | 18.33 | 18.33 | 18.33 |
| Width of flow path, in | 130.12 | 96.87 | 130.12 | 96.87 |
| Overflow Weir Height, in | 3.00 | 3.00 | 3.00 | 3.00 |
| Downcomer clearance, in | 2.50 | 2.50 | 2.50 | 2.50 |
| Inlet Weir height, in | 0 | 0 | 0 | 0 |
| Valve Pitch | 12.00 | 12.00 | 12.00 | 12.00 |
| Number of valves/tray | 222 | 166 | 222 | 166 |

TABLE V

|  | Vapor | Liquid |
| --- | --- | --- |
| Nitrogen | 0 | 0 |
| Carbon Dioxide | 0.008 | 0.004 |
| Methane | 0.0141 | 0.0077 |
| Ethane | 0.3079 | 0.1681 |
| Propane | 0.6197 | 0.4346 |
| Isobutane | 0.0258 | 0.0319 |
| n-Butane | 0.0266 | 0.0420 |
| Isopentane | 0.0019 | 0.0058 |
| n-Pentane | 0.0012 | 0.0042 |
| Heptane | 0.0003 | 0.0028 |
| MSO | 0.0015 | 0.3026 |
| Total | 0.9998 | 1.0001 |
| Mols | 233,274 | 430,701 |
| LR | 0.400 |  |
| Rates Per Tray: | | |
| Density, lbs./cu. ft | 2.168 | 33.584 |
| Viscosity, centipoise | 0.010 | 0.143 |
| Rate, c.f.s | 50.281 | 11.320 |
| Rate, V Load | 13.209 |  |
| Rate, Std. g.p.d | 2,394,607 |  |
| Rate, Std. g.p.d/sq. ft of c.s.a | 19,513 |  |
| Rate, g.p.d |  | 7,315,665 |
| Rate, g.p.m |  | 5,080 |

|  | Paths b and c Trays A, B, C, D | | Paths a and b Trays A, B, C, D | |
| --- | --- | --- | --- | --- |
|  | Vapor | Liquid | Vapor | Liquid |
| Rate, c.f.s | 14.412 | 3.245 | 10.729 | 2.415 |
| Rate, V Load | 3.786 |  | 2.818 |  |
| Rate, Std. g.p.d | 686,349 |  | 510,954 |  |
| Rate, g.p.d |  | 2,096,837 |  | 1,560,996 |
| Rate, g.p.m |  | 1,456 |  | 1,084 |

TABLE VII

Sieve Tray Column Data

|  | Path e | Path f | Path g |
| --- | --- | --- | --- |
| Type tray, three path flow: | | | |
| Tray Spacing, in | 24 | 24 | 24 |
| Tower diameter, ft | 9.00 | 9.00 | 9.00 |
| Tower area, sq. ft | 63.62 | 63.62 | 63.62 |
| Downcomer area, sq. ft | 1.93 | 2.49 | 1.93 |
| Downcomer seal area, sq. ft | 1.93 | 2.49 | 1.93 |
| Bubbling area, sq. ft | 15.48 | 19.93 | 15.48 |
| Free area, sq. ft | 17.42 | 22.43 | 17.42 |
| Min. area under Downcomer, sq. ft | 2.08 | 2.18 | 1.14 |
| Area under Splash Baffle, sq. ft | 0 | 0 | 0 |
| Waste Area, sq. ft | 0 | 0 | 0 |
| Hole Area, sq. ft | 1.55 | 1.99 | 1.55 |
| Percent Hole Area | 10.00 | 10.00 | 10.00 |
| Hole Diameter, in | 1.000 | 1.000 | 1.000 |
| Tray thickness, in | 0.1345 | 0.1345 | 0.1345 |
| Overflow Weir Height, in | 3.00 | 3.00 | 3.00 |
| Overflow Weir Length, in.[1] | 54.93 | 104.61 | 100.61 |
| Length of Overflow Blanked area, in | 0 | 0 | 0 |
| Inlet weir height, in | 0 | 0 | 0 |
| Inlet weir length, in.[1] | 100.61 | 104.61 | 54.93 |
| Length of inlet Blanked area, in | 0 | 0 | 0 |
| Length of Flow path, in | 26.86 | 26.86 | 26.86 |
| Width of flow path, in | 77.77 | 105.74 | 77.77 |
| Hole spacing, inches | 3.01 | 3.01 | 3.01 |
| Smooth side of tray up Hole Arrangement Equilateral Triangle | | | |

[1] Does not include any blanked area.

TABLE VI

|  | Trays A and C | | Trays B and D | |
| --- | --- | --- | --- | --- |
|  | Paths b and c | Paths a and d | Paths b and c | Paths a and d |
| Flooding check: Fraction Flood at Design V/L Ratio | 0.918 | 0.918 | 0.838 | 0.838 |
| Hydraulics: | | | | |
| Downcomer Back-Up | 10.575 | 10.575 | 10.965 | 10.965 |
| Dry Tray Pressure Drop | 1.951 | 1.951 | 1.951 | 1.951 |
| Total Tray Pressure Drop | 5.984 | 5.984 | 5.502 | 5.502 |
| Pressure Drop through Minimum Area Under Downcomer | 1.040 | 1.040 | 1.430 | 1.430 |
| Height of Liquid on Tray | 4.033 | 4.033 | 3.551 | 3.551 |
| Downcomer Residence Time, seconds | 5.129 | 5.129 | 5.129 | 5.129 |
| Vapor Velocities, ft. sec. Bubbling Area | 0.778 | 0.778 | 0.778 | 0.778 |
| Tray Efficiency for the key Components | 0.609 | 0.609 | 0.567 | 0.567 |
| Liquid Rates: | | | | |
| G.p.m./inch of Overflow Weir Length | 12.157 | 12.157 | 10.367 | 10.367 |
| G.p.m./inch of Average Flow Path Width | 11.191 | 11.191 | 11.191 | 11.191 |

TABLE VIII

|  | Path 1 | | Path 2 | | Path 3 | |
|---|---|---|---|---|---|---|
|  | Vapor | Liquid | Vapor | Liquid | Vapor | Liquid |
| Component: | | | | | | |
| Propylene | 0.0005 | 0.0003 | 0.0005 | 0.0003 | 0.0005 | 0.0003 |
| Propane | 0.0009 | 0.0005 | 0.0009 | 0.0005 | 0.0009 | 0.0005 |
| Isobutane | 0.0247 | 0.0160 | 0.0247 | 0.0160 | 0.0247 | 0.0160 |
| 1-butene | 0.0290 | 0.0190 | 0.0290 | 0.0190 | 0 0290 | 0.0190 |
| n-Butane | 0.0226 | 0.0151 | 0.0226 | 0.0151 | 0.0226 | 0.0151 |
| t-Butene-2 | 0.0542 | 0.0370 | 0.0542 | 0.0370 | 0.0542 | 0.0370 |
| C-Butene-2 | 0.0435 | 0.0297 | 0.0435 | 0.0297 | 0.0435 | 0.0397 |
| Isopentane | 0.1418 | 0.1079 | 0.1418 | 0.1079 | 0.1418 | 0.1079 |
| 1-pentene | 0.3318 | 0.2619 | 0.3318 | 0.2619 | 0.3318 | 0.2619 |
| n-Pentane | 0.0308 | 0.0245 | 0.0308 | 0.0245 | 0.0308 | 0.0245 |
| Methylcyclohexane | 0.3202 | 0.4880 | 0.3202 | 0.4880 | 0.3202 | 0.4880 |
| Total | 1.0000 | 0.9999 | 1.0000 | 0.9999 | 1.0000 | 0.9999 |
| Mols | 28,561 | 47,906 | 36,778 | 61,688 | 28,561 | 47,906 |
| LR | 0.900 | | 0.900 | | 0.900 | |
| Rates Per Tray: | | | | | | |
| Density, lbs./cu. ft | 2.212 | 32.328 | 2.212 | 32.328 | 2.212 | 32.328 |
| Viscosity, centipoise | 0.011 | 0.111 | 0.011 | 0.111 | 0.011 | 0.111 |
| Rate, c.f.s | 11.518 | 1.415 | 14.832 | 1.822 | 11.518 | 1.415 |
| Rate, V Load | 3.122 | | 4.020 | | 3.122 | |
| Rate, Std. g.p.d | 387,910 | | 499,512 | | 387,910 | |
| Rate, Std. g.p.d./sq. ft | 6,098 | | 7,852 | | 6,098 | |
| Rate, g.p.d | | 914,258 | | 1,177,279 | | 914,258 |
| Rate, g.p.m | | 635 | | 818 | | 635 |

TABLE IX

|  | Flooding check, Path e | |
|---|---|---|
|  | Vapor Load | Safety Factor Vapor Load, Flood/Design |
| (1) Design Load | 3.122 | |
| (2) Jet flood at Max. Design Liquid Load | 4.242 | 1.359 |
| (3) Jet Flood at Design V/L Ratio | 3.648 | 1.169 |
| (4) Flooding by Blowing | 9.365 | 3.000 |
| (5) Flooding by System Limitation | 3.408 | 1.092 |

| Hydraulics | Path e | Path f | Path g |
|---|---|---|---|
| Downcomer Back-Up | 8.283 | 7.526 | 7.612 |
| Dry Tray Pressure Drop | 0.961 | 1.004 | 1.025 |
| Total Tray Pressure Drop | 4.487 | 4.061 | 3.873 |
| Pressure drop through Downcomer Seal | 0.269 | 0.407 | 0.891 |
| Height of Liquid on Tray | 3.527 | 3.057 | 2.848 |
| Downcomer Residence Time, seconds | 2.736 | 2.736 | 2.736 |
| Liquid Rates: | | | |
| G.p.m./inch of Overflow Weir Length | 11.558 | 7.815 | 6.311 |
| G.p.m./inch of Average Flow Path Width | 8.164 | 7.732 | 8.164 |

| Flooding check, Path f | | | Flooding check, Path g | | |
|---|---|---|---|---|---|
| Vapor Load | Liquid Load, cu. ft./sec. | Safety Factor Vapor Load, Flood/Design | Vapor Load | Liquid Load, cu. ft./sec. | Safety Factor Vapor Load Flood/Design |
| 4.020 | 1.822 | | 3.122 | 1.415 | |
| 5.702 | | 1.419 | 4.242 | | 1.359 |
| 4.833 | | 1.202 | 3.648 | | 1.169 |
| 11.088 | | 2.758 | 8.255 | | 2.644 |
| 4.388 | | 1.092 | 3.408 | | 1.092 |

SIEVE TRAY, CAPACITY CHECK

| Vapor Velocities, ft./sec. | Path e | Path f | Path g |
|---|---|---|---|
| Bubbling area | 0.744 | 0.744 | 0.744 |
| Hole area | 7.441 | 7.442 | 7.441 |
| Tray Efficiency for the Key Components | 0.837 | .800 | .782 |

TABLE X

|  | Sieve Tray Column Data | | |
|---|---|---|---|
|  | Path e | Path f | Path g |
| Tray Spacing, in | 24 | 24 | 24 |
| Tower Diameter, ft | 9.00 | 9.00 | 9.00 |
| Tower Area, sq. ft | 63.62 | 63.62 | 63.62 |
| Downcomer Area, sq. ft | 1.93 | 2.49 | 1.93 |
| Downcomer Seal Area, sq. ft | 1.93 | 2.49 | 1.93 |
| Bubbling area, sq. ft | 15.48 | 19.93 | 15.48 |
| Free Area, sq. ft | 17.42 | 22.43 | 17.42 |
| Min. Area Under Downcomer, sq. ft | 1.14 | 1.47 | 1.14 |
| Area Under Splash Baffle, sq. ft | 0 | 0 | 0 |
| Waste Area, sq. ft | 0 | 0 | 0 |
| Hole Area, sq. ft | 1.55 | 1.99 | 1.55 |
| Percent Hole Area | 10.00 | 10.00 | 10.00 |
| Hole Diameter, in | 1.000 | 1.000 | 1.000 |
| Tray Thickness, in | 0.1345 | 0.1345 | 0.1345 |
| Overflow Weir Height, in | 3.00 | 3.00 | 3.00 |
| Overflow Weir Length, in.[1] | 54.93 | 70.73 | 54.93 |
| Length of Overflow Blanked Area, in | 0 | 33.88 | 45.68 |
| Inlet Weir Height, in | 0 | 0 | 0 |
| Inlet Weir Length, in.[1] | 54.93 | 70.73 | 54.93 |
| Length of Inlet Blanked Area, in | 45.68 | 33.88 | 0 |
| Length of Flow Path, in | 26.86 | 26.86 | 26.86 |
| Width of Flow Path, in | 77.77 | 105.74 | 77.77 |
| Hole Spacing, inches | 3.01 | 3.01 | 3.01 |
| Smooth side of Tray Up | | | |
| Hole Arrangement Equilateral Triangle | | | |

[1] Does not include any blanked area.

TABLE XI

[Temperature, 347° F., Pressure 200 p.s.i.a.]

|  | Path e | | Path f | | Path g | |
| --- | --- | --- | --- | --- | --- | --- |
|  | Vapor | Liquid | Vapor | Liquid | Vapor | Liquid |
| Component: | | | | | | |
| Propylene | 0.0005 | 0.0003 | 0.0005 | 0.0003 | 0.0005 | 0.0003 |
| Propane | 0.0009 | 0.0005 | 0.0009 | 0.0005 | 0.0009 | 0.0005 |
| Isobutane | 0.0247 | 0.0160 | 0.0247 | 0.0160 | 0.0247 | 0.0160 |
| 1-butene | 0.0290 | 0.0190 | 0.0290 | 0.0190 | 0.0290 | 0.0190 |
| n-Butane | 0.0226 | 0.0151 | 0.0226 | 0.0151 | 0.0226 | 0.0151 |
| t-Butene-2 | 0.0542 | 0.0370 | 0.0542 | 0.0370 | 0.0542 | 0.0370 |
| c-Butene-2 | 0.0435 | 0.0297 | 0.0435 | 0.0297 | 0.0435 | 0.0297 |
| Isopentane | 0.1418 | 0.1079 | 0.1418 | 0.1079 | 0.1418 | 0.1079 |
| 1-Pentene | 0.3318 | 0.2619 | 0.3318 | 0.2619 | 0.3318 | 0.2619 |
| n-Pentane | 0.0308 | 0.0245 | 0.0308 | 0.0245 | 0.0308 | 0.0245 |
| Methylcyclohexane | 0.3202 | 0.4880 | 0.3202 | 0.4880 | 0.3202 | 0.4880 |
| Total | 1.0000 | 0.9999 | 1.0000 | 0.9999 | 1.0000 | 0.9999 |
| Mols | 28,561 | 47,906 | 36,778 | 61,688 | 28,561 | 47,906 |
| LR | 0.900 | | 0.900 | | 0.900 | |
| Rates Per Tray: | | | | | | |
| Density, lbs/cu. ft | 2.212 | 32.328 | 2.212 | 32.328 | 2.212 | 32.328 |
| Viscosity, centipoise | 0.011 | 0.111 | 0.011 | 0.111 | 0.011 | 0.111 |
| Rate, c.f.s | 11.518 | 1.415 | 14.832 | 1.822 | 11.518 | 1.415 |
| Rate, V Load | 3.122 | | 4.020 | | 3.122 | |
| Rate, Std. g.p.d | 387,910 | | 499,512 | | 387,910 | |
| Rate, Std. g.p.d./Sq. Ft. of c.s.a | 6,098 | | 7,852 | | 6,098 | |
| Rate, g.p.d | | 914,258 | | 1,177,279 | | 914,258 |
| Rate, g.p.m | | 635 | | 818 | | 635 |

TABLE XII

|  | Flooding Check, Path e | | |
| --- | --- | --- | --- |
|  | Vapor Load | Liquid Load, cu. ft./sec. | Safety Factor Vapor Load, Flood/Design |
| (1) Design Load | 3.122 | 1.415 |  |
| (2) Jet Flood at Max. Design Liquid Load | 4.242 |  | 1.359 |
| (3) Jet Flood at Design V/L Ratio | 3.648 |  | 1.169 |
| (4) Flooding by Blowing | 9.365 |  | 3.000 |
| (5) Flooding by System Limitation | 3.408 |  | 1.092 |

| Hydraulics | Path e | Path f | Path g |
| --- | --- | --- | --- |
| Downcomer Back-Up | 8.905 | 8.905 | 8.905 |
| Dry Tray Pressure Drop | 0.961 | 0.961 | 0.961 |
| Total Tray Pressure Drop | 4.487 | 4.488 | 4.487 |
| Pressure Drop Through Downcomer Seal | 0.891 | 0.890 | 0.891 |
| Height of Liquid on Tray | 3.527 | 3.527 | 3.527 |
| Downcomer Residence Time, seconds | 2.736 | 2.736 | 2.736 |
| Liquid Rates: | | | |
| G.p.m./Inch of Overflow Weir Length | 11.558 | 11.558 | 11.558 |
| G.p.m./Inch of Average Flow Path Width | 8.164 | 7.732 | 8.164 |

|  | Flooding Check, Path f | | |
| --- | --- | --- | --- |
| Vapor Load | Liquid Load, cu. ft./sec. |  | Safety Factor Vapor Load, Flood/Design |
| (1) 4.020 | 1.822 |  |  |
| (2) 5.702 |  |  | 1.419 |
| (3) 4.833 |  |  | 1.202 |
| (4) 12.057 |  |  | 2.999 |
| (5) |  |  | 1.092 |

|  | Flooding Check, Path g | | |
| --- | --- | --- | --- |
| (1) 3.122 | 1.415 |  |  |
| (2) 4.242 |  |  | 1.359 |
| (3) 3.648 |  |  | 1.169 |
| (4) 9.365 |  |  | 3.000 |
| (5) 3.408 |  |  | 1.092 |

| Vapor Velocities, ft./sec | Path e | Path f | Path g |
| --- | --- | --- | --- |
| Bubbling area | 0.744 | 0.744 | 0.744 |
| Hole Area | 7.441 | 7.442 | 7.441 |
| Tray Efficiency for the Key Components | 0.837 | .836 | .837 |

I claim:

1. A fractional distillation column comprising:

a plurality of three-path vapor-liquid contact trays having two zones of unequal area;

a first downcomer for each tray feeding on the perimeter thereof;

a second downcomer for each tray parallel with said first downcomer spaced from the perimeter of said tray and positioned above said two zones and distributing liquid to said two zones of said tray having unequal areas;

said first and second downcomers being spaced to provide equal flow paths on each of said trays;

baffle means on each side of said second downcomer, said baffle means having a plurality of separate flow openings spaced along said baffle means and proportional to the zones of unequal area being fed by said second downcomer to obtain distribution of the liquid in proportion to the two areas of said zones over which it flows;

a first weir on each of said trays to regulate flow into a corresponding first downcomer for the next lower tray;

second and third weirs on each of said trays to regulate flow with a corresponding second downcomer for said next lower tray; and baffle means on said second and third weirs, said baffle means having a plurality of separate flow openings spaced along said baffle means to fix the ratio of the effective lengths thereof to provide the desired height of liquid on the flow paths of said trays.

2. A fractional distillation column comprising:

a plurality of first four-path vapor-liquid contact trays having zones of unequal areas;

a pair of first horizontally elongated parallel downcomers for each of said first vapor-liquid contact trays, spaced to distribute liquid over four equal flow paths on each of said first trays, each of said first downcomers being positioned above two zones of unequal area and distributing liquid to said two zones having unequal areas;

a plurality of second four-path vapor-liquid contact trays alternately spaced between said first trays;

a pair of second horizontally elongated parallel downcomers for each of said second trays parallel in vertical projection with said first downcomers feeding on the perimeter thereof;

a centrally located third horizontally elongated downcomer for each of said second trays, parallel with said second downcomer;

baffle means on each of said first downcomers, said baffle means having a plurality of separate flow openings spaced along said baffle means and proportional to the zones of unequal area being fed by said second downcomers to effect distribution of the liquid in proportion to the areas of the zone over which it flows;

a pair of first overflow weirs on each of said second trays positioned to regulate flow of liquid from said second trays into each corresponding first downcomer;

a second overflow weir on each of said first trays to regulate flow of liquid from said first trays into each corresponding second downcomer; and a pair of third overflow weirs on each of said first trays to regulate flow of liquid from said first trays into corresponding third downcomers.

3. The distillation column of claim 2 including baffle means on said third downcomers providing the desired height of liquid therein and maintaining equal effective lengths on the sides thereof;

baffle means on each pair of said first weirs to fix the ratio of effective lengths thereof to provide the desired height of liquid on the flow paths on said second trays; and baffle means on each pair of said third overflow weirs to provide the desired height of the liquid on the flow paths of said first tray.

References Cited

UNITED STATES PATENTS

| | | | |
|---|---|---|---|
| 2,646,266 | 7/1953 | Lockwood | 261—114 |
| 2,646,977 | 7/1953 | Kraft | 261—114 |
| 2,698,746 | 1/1955 | Reynolds | 261—114 |
| 2,786,082 | 3/1957 | Klockman | 261—114 X |
| 2,917,293 | 12/1959 | Mendelsohn et al. | 261—114 |
| 2,960,322 | 11/1960 | Eld | 261—114 |
| 2,988,347 | 6/1961 | Molique | 261—114 X |

RONALD R. WEAVER, *Primary Examiner.*

U.S. Cl. X.R.

23—270.5; 202—158